Nov. 22, 1927.
T. L. DOUGLASS ET AL
1,649,950
BRUSH CUTTING SAW
Filed May 6, 1926
2 Sheets-Sheet 2
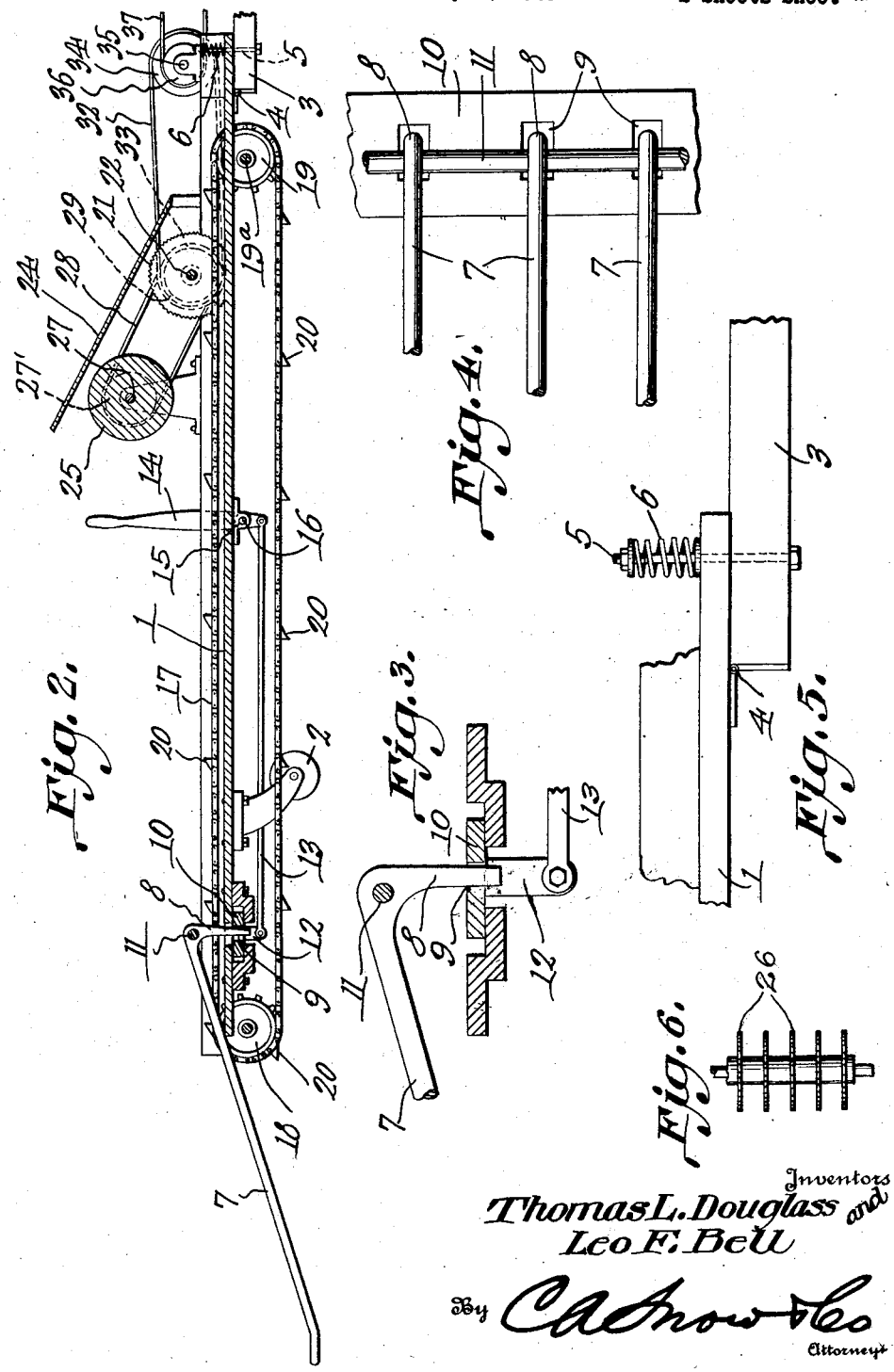
Inventors
Thomas L. Douglass and
Leo F. Bell
By C.A.Snow & Co
Attorneys Patented Nov. 22, 1927.

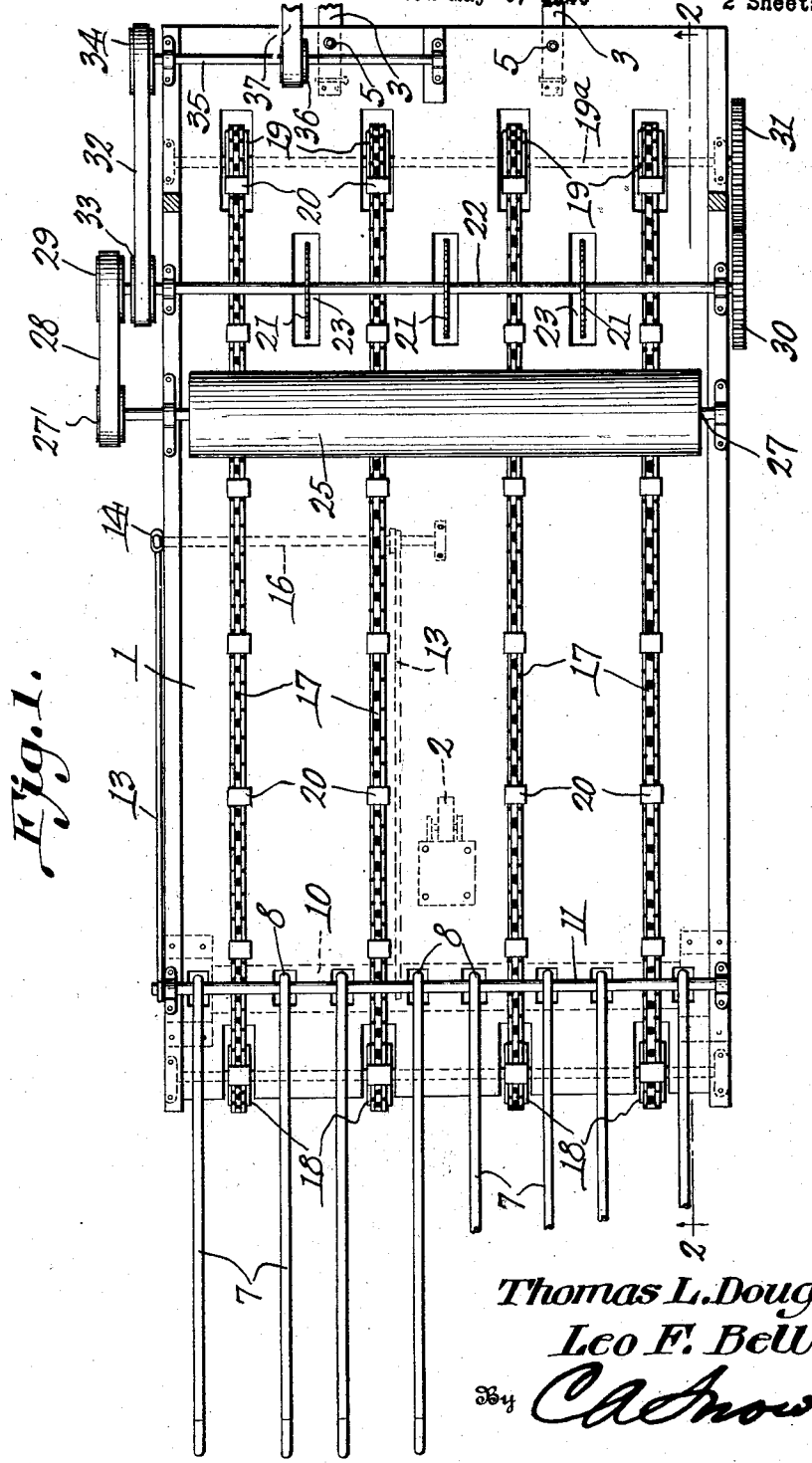

1,649,950

UNITED STATES PATENT OFFICE.

THOMAS L. DOUGLASS AND LEO F. BELL, OF ORANGE COVE, CALIFORNIA.

BRUSH-CUTTING SAW.

Application filed May 6, 1926. Serial No. 107,298.

This invention relates to bush cutting machine and more particularly to saws for cutting up prunings, brush and the like from vineyards and orchards into short lengths to provide for them being plowed under for fertilizer.

The object of the invention is to construct a saw of this character which may be attached to the front of a tractor and pushed along the vine or tree rows scooping up prunings and brush and conducting it back to the saws where it is cut into short lengths and distributed behind the implement.

Another object is to provide a saw of this character having a series of adjustable pick-up fingers arranged to compensate for inequalities in the ground surface and equipped with means whereby they may be raised clear of the ground when found desirable to do so.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of a saw constructed in accordance with this invention, the pick-up fingers being broken off for convenience in illustration;

Fig. 2 is a longitudinal section thereof;

Fig. 3 is a detail longitudinal sectional view showing the mounting of one of the pick-up fingers;

Fig. 4 is a top plan view of a detail of the pick-up fingers; and

Fig. 5 is a detail side elevation showing the flexible connection for uniting the implement to a tractor.

Figure 6 is a fragmental detail view of the saws and illustrating the modified form of the invention.

In the embodiment illustrated, a platform 1 is shown supported at its front end by wheels 2 and equipped at its rear end with adjustable arms 3 for flexibly connecting it with a tractor, not shown. These arms 3 have a hinged connection with the side members of the platform as shown at 4, said connection being at a point spaced beyond the rear edge of the platform and said rear edge is connected with the arms by bolts 5 extending through the arms and the platform and provided above the platform with coiled springs 6 which provide a yieldable connection between the arms and the platform.

A series of adjustable pick-up fingers 7 are attached to the front of the platform 1. These fingers 7 have depending right-angular inner ends 8 adapted to extend into slots 9 formed in a plate 10 which extends transversely of the platform and is operated in a manner presently to be described.

These fingers 7 are pivotally mounted at the junction of their right-angular ends on a rod 11 which extends transversely of the platform in a plane above the plate 10.

Legs 12 depend from plate 10 and are here shown triangular in form with actuating rods 13 pivotally connected therewith at one end and at their other ends are connected with an actuating lever 14 fulcrumed on the platform as shown at 15 in Fig. 2. The inner ends of the rods 13 are connected by a cross rod 16 so that the rods 13 will operate in unison on the shifting of the lever 14. It will be obvious that the lever 14 is shiftable to raise or lower the fingers 7 it being desirable to raise them when the implement is being drawn from one field to another.

The mounting of the right-angular inner ends of the fingers 7 in slots 9 of the plate 10 permits these fingers to move up and down a predetermined distance to compensate for inequalities in the surface of the ground over which they travel.

A plurality of parallel chain belts 17 run over sprockets 18 and 19 and are each provided with a plurality of hooks 20 which are designed to engage the prunings picked up by the fingers 7 and deposited on the platform and the chains convey them to the saws now to be described.

A plurality of saws 21 mounted on a transversely arranged rod 22 extend through openings 23 in the platform and cooperate with a roller 25 which may be either solid as shown in Fig. 1 or it may be in the form of a series of saws 26 as shown in Fig. 6. This roller 25 is mounted on a shaft 27 suitably journaled on the platform and having one end thereof projecting beyond the sides of the platform and equipped with a pulley 27' over which runs a belt 28 which passes also around a pulley 29 mounted on the saw carrying shaft 22. This saw carrying shaft 22 is provided at its other end beyond the platform with a gear 30 which meshes with another gear 31 fixed to the shaft 19ª which carries the sprockets 19. A belt 32 connects a pulley 33 on shaft 22 with a similar pulley 34 and a countershaft 35 which carries a pulley 36 over which runs a belt 37 which extends to the tractor (not shown) and is driven thereby.

A guard 24 is preferably arranged over the saws 21 and the roller 25 as shown in Fig. 2 to protect the machine and to prevent the brush being cut from rising upward.

In the use of this machine, it being connected with a tractor by the flexible connection provided by the arms 3, the forward movement of the tractor will push the saws along in front thereof causing the fingers 7 to scoop up prunings, brush and the like and lift it onto the platform where it is engaged by the hooks 20 of the sprocket belts or chains 17 and carried rearwardly along the platform under the roller 25 into contact with the rotary saws 21 which cut the prunings or brush into short lengths and distribute them on the ground in rear of the platform.

The prunings and brush so cut up by the saws may be plowed under for fertilizer.

This machine is simple in construction and may be readily attached to or removed from a tractor by connecting or disconnecting the arms 3.

We claim:—

In a brush cutting machine having a platform, the combination of saws and a series of longitudinally disposed feeding conveyors carried on said platform, a transversely disposed plate movably supported under the forward end of the platform and having a plurality of openings arranged in spaced relation with each other, a transverse rod mounted above the conveyors, spring pick-up fingers rockably mounted on the rod, and having right angled inner ends positioned in the openings, and means for moving the plate to adjust the spring fingers.

In testimony that we claim the foregoing as our own, we have hereto affixed our signatures.

THOMAS L. DOUGLASS.
LEO F. BELL.